United States Patent
Alcorn et al.

(10) Patent No.: US 10,883,912 B2
(45) Date of Patent: Jan. 5, 2021

(54) BIEXPONENTIAL TRANSFORMATION FOR GRAPHICS DISPLAY

(71) Applicant: Becton, Dickinson and Company, Franklin Lakes, NJ (US)

(72) Inventors: Bryan C. Alcorn, Livermore, CA (US); Tom Becker, Mountain View, CA (US); Michael Goldberg, San Jose, CA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 368 days.

(21) Appl. No.: 15/996,958

(22) Filed: Jun. 4, 2018

(65) Prior Publication Data
US 2019/0369001 A1    Dec. 5, 2019

(51) Int. Cl.
*G01N 15/14* (2006.01)
*G06F 3/0484* (2013.01)
*G06T 11/20* (2006.01)

(52) U.S. Cl.
CPC ..... *G01N 15/1429* (2013.01); *G06F 3/04847* (2013.01); *G06T 11/203* (2013.01); *G06T 2200/24* (2013.01); *G06T 2210/12* (2013.01)

(58) Field of Classification Search
CPC .................................................. G01N 15/1429
USPC ........................................................ 702/128
See application file for complete search history.

(56) References Cited

U.S. PATENT DOCUMENTS

| | | | |
|---|---|---|---|
| 4,845,653 A | 7/1989 | Conrad et al. | |
| 5,627,040 A | 5/1997 | Bierre et al. | |
| 5,739,000 A | 4/1998 | Bierre et al. | |
| 5,795,727 A | 8/1998 | Bierre et al. | |
| 5,962,238 A | 10/1999 | Sizto et al. | |
| 6,014,904 A * | 1/2000 | Lock | G06K 9/00147 73/865.5 |
| 6,944,338 B2 | 9/2005 | Lock et al. | |
| 9,567,645 B2 | 2/2017 | Fan et al. | |
| 2007/0118297 A1* | 5/2007 | Thayer | G16H 50/70 702/21 |
| 2011/0047448 A1* | 2/2011 | Bastos dos Santos | G06F 40/174 715/227 |
| 2012/0245889 A1* | 9/2012 | Zhu | G01N 15/10 702/181 |

(Continued)

OTHER PUBLICATIONS

Bauer et al. (eds.), Clinical Flow Cytometry: Principles and Applications, Williams & Wilkins (Jan. 1993).

(Continued)

*Primary Examiner* — Ricky Ngon
(74) *Attorney, Agent, or Firm* — Bret E. Field; Bozicevic, Field & Francis LLP

(57) ABSTRACT

The gating control features described include creating a first gate in a scaled data space. The scaling properties may be stored or associated with the gate. As the scaling parameters are changed for the gate—either manually or through automated detection—the scaled properties are continually updated to reflect the most recent changes. When gate properties are changed on a gate that applies to multiple data sets, the correct scaled properties are continuously stored with the gate for each data set, as the properties are being change interactively. The features also allow for backwards compatibility by associating current scaling parameters with a predefined gate.

20 Claims, 8 Drawing Sheets

(56) References Cited

U.S. PATENT DOCUMENTS

2014/0349313 A1* 11/2014 Balderas .......... G01N 33/56966
                                                      435/7.24
2017/0016828 A1*  1/2017 Xu ..................... G01N 15/1459
2018/0018386 A1*  1/2018 Orlova ................. G06F 3/0482
2018/0306698 A1* 10/2018 Kasdan .............. G01N 15/1429

OTHER PUBLICATIONS

Jaroszeski et al. (eds.), Flow Cytometry Protocols, Methods in Molecular Biology No. 91, Humana Press (1998).
Landy et al. (eds.), Clinical Flow Cytometry, Annals of the New York Academy of Sciences vol. 677 (1993).
Ormerod (ed.), Flow Cytometry: A Practical Approach, Oxford Univ. Press (1994).
Pawley (ed.), Handbook of Biological Confocal Microscopy, 2nd Edition, Plenum Press (1989).
Practical Shapiro, Flow Cytometry, 4th ed., Wiley-Liss (2003).

* cited by examiner

BIEXPONENTIAL TRANSFORMATION FOR GRAPHICS DISPLAY

FIELD

The present application generally relates to gating systems and methods, specifically gating systems and methods for maintaining representations of gates and managing gate manipulations during transformations of quantitative biological event data.

BACKGROUND

Particle analyzers, such as thermal cyclers and flow and scanning cytometers, are analytical tools that enable the characterization of particles on the basis of optical parameters such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components may be simultaneously detected by using spectrally distinct fluorescent dyes to label the different particles or components. In some implementations, a multiplicity of photodetectors, one for each of the scatter parameters to be measured, and one for each of the distinct dyes to be detected are included in the analyzer. The data obtained comprise the signals measured for each of the light scatter parameters and the fluorescence emissions.

Cytometers may further comprise means for recording the measured data and analyzing the data. For example, data storage and analysis may be carried out using a computer connected to the detection electronics. For example, the data can be stored in tabular form, where each row corresponds to data for one particle, and the columns correspond to each of the measured parameters. The use of standard file formats, such as an "FCS" file format, for storing data from a flow cytometer facilitates analyzing data using separate programs and/or machines. Using current analysis methods, the data typically are displayed in 2-dimensional (2D) plots for ease of visualization, but other methods may be used to visualize multidimensional data.

The parameters measured using a flow cytometer typically include the excitation light that is scattered by the particle along a mostly forward direction, referred to as forward scatter (FSC), the excitation light that is scattered by the particle in a mostly sideways direction, referred to as side scatter (SSC), and the light emitted from fluorescent molecules in one or more channels (range of frequencies) of the spectrum, referred to as FL1, FL2, etc., or by the fluorescent dye that is primarily detected in that channel. Different cell types can be identified by the scatter parameters and the fluorescence emissions resulting from labeling various cell proteins with dye-labeled antibodies.

Scattered light tends to scale linearly with the size, opacity or internal complexity of the object being measured. Therefore scatter parameters may be analyzed without any data transformation. Light emitted by fluorescent dyes tends to scale exponentially. Therefore fluorescence parameters may be transformed to a logarithmic scale for analysis. But the logarithmic scale may not provide the desired level of accuracy, such as for measurements at low levels of brightness. More complex transformations may be included to convert the raw data to values that more accurately represent the events being measured. The transformation can also help deal with other effects caused by the design of the detectors, degradation of the sample, and so on. A parameterized transformation can be adjusted to optimize the analysis of a sample or a subset of a sample. The adjustment can be done manually and interactively (e.g., via a graphical user interface), or automatically.

Both flow and scanning cytometers are commercially available from, for example, BD Biosciences (San Jose, Calif.). Flow cytometry is described in, for example, Landy et al. (eds.), Clinical Flow Cytometry, Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91, Humana Press (1997); and Practical Shapiro, Flow Cytometry, 4th ed., Wiley-Liss (2003); all incorporated herein by reference. Fluorescence imaging microscopy is described in, for example, Pawley (ed.), Handbook of Biological Confocal Microscopy, 2nd Edition, Plenum Press (1989), incorporated herein by reference.

The data obtained from an analysis of cells (or other particles) by multi-color flow cytometry are multidimensional, wherein each cell corresponds to a point in a multi-dimensional space defined by the parameters measured. Populations of cells or particles are identified as clusters of points in the data space. The identification of clusters and, thereby, populations can be carried out manually by drawing a gate around a population displayed in one or more 2-dimensional plots, referred to as "scatter plots" or "dot plots," of the data. Other representations of the data may be provided using density plots or contour plots. Alternatively, clusters can be identified, and gates that define the limits of the populations, can be determined automatically. Examples of methods for automated gating have been described in, for example, U.S. Pat. Nos. 4,845,653; 5,627,040; 5,739,000; 5,795,727; 5,962,238; 6,014,904; and 6,944,338; and U.S. Pat. Pub. No. 2012/0245889, each incorporated herein by reference.

Flow cytometry is a valuable method for the analysis and isolation of biological particles such as cells and constituent molecules. As such it has a wide range of diagnostic and therapeutic applications. The method utilizes a fluid stream to linearly segregate particles such that they can pass, single file, through a detection apparatus. Individual particles can be distinguished according to their location in the fluid stream relative to other particles and the presence of detectable markers. Thus, a flow cytometer can be used to produce a diagnostic profile of a population of biological particles.

Isolation of biological particles has been achieved by adding a sorting or collection capability to particle analyzers. Particles in a segregated stream, detected as having one or more desired characteristics, are individually isolated from the sample stream by, for example, mechanical or electrical removal. This method of flow sorting has been used to sort cells of different types, to separate sperm bearing X and Y chromosomes for animal breeding, to sort chromosomes for genetic analysis, and to isolate particular organisms from complex biological population.

Gating can be used to help make sense of the large quantity of data that may be generated from a sample. Given the large quantities of data presented for a given sample, there exists a need to efficiently and accurately control the graphical display of the data to provide a consistent view even after transforming the data. The analysis using gating may not be limited to visualization or large quantities of data. For example, small data sets may be obtained in, for example, clinical applications or pharmaceutical research. In such instances, gating can be used to classify items for statistical analysis. Such statistics can reflect important characteristics of a subject. For example, a percentage of CD4 detected for an AIDS patient can be an indicator of health for the patient.

SUMMARY

The systems, methods, and devices of the disclosure each have several innovative aspects, no single one of which is solely responsible for the desirable attributes disclosed herein.

The systems, methods, and devices of the disclosure each have several innovative aspects, no single one of which is solely responsible for the desirable attributes disclosed herein.

In one innovative aspect a gating control device for processing particle measurements is provided. The gating control device includes an input device port configured to receive messages from input devices. The gating control device also includes an event listener in data communication with the input device port, the event listener configured process the messages received from the input devices. The gating control device also includes a computer-readable memory storing executable instructions; and one or more computer processors in communication with the computer-readable memory, where the one or more computer processors are configured to execute the executable instructions. The executable instructions cause the one or more computer processors to receive, from a first input device via the input device port, gate data including vertices defining an area of interest for a first graphical plot of particle measurements. The executable instructions cause the one or more computer processors to determine that the first graphical plot presents the particle measurements using a scaling parameter, where the scaling parameter identifies a non-linear scaling factor for at least on dimension of measurement included in the particle measurements. The executable instructions cause the one or more computer processors to generate linear vertices for the area of interest based at least in part on the vertices and the non-linear scaling factor. The executable instructions cause the one or more computer processors to create a data record including the scaling parameter, the vertices, and the linear vertices in association with an identifier for the area of interest. Other embodiments of this aspect include corresponding computer systems, apparatus, and computer programs recorded on one or more computer storage devices, each configured to perform the actions of the methods.

Implementations of the gating control device may include one or more of the following features. The one or more computer processors may be further configured to execute the executable instructions to at least: receive, from the event listener, a gate movement event indicating a new location for the gate; update the vertices included in the data record to identify the new location of the gate; and update the linear vertices included in the data record based on the new location for the gate and the scaling parameter. The one or more computer processors may be further configured to execute the executable instructions to at least: identify a first portion of the particle measurements within the area of interest; and upon receiving the gate movement event, identify a second portion of the particle measurements within the new location. The one or more computer processors may be configured to execute the executable instructions to at least cause display of a polygon bounding measurements corresponding to the second portion of the particle measurements. The one or more computer processors may be further configured to execute the executable instructions to at least: receive, from the event listener, a gate scaling event indicating new scaling parameter for the first plot; update the scaling parameter included in the data record to identify the new scaling parameter; and update the vertices included in the data record by scaling the linear vertices using the new scaling parameter. The one or more computer processors may be further configured to execute the executable instructions to at least: identify a first portion of the particle measurements within a scaled area of interest; and upon receiving the gate scaling event, identify a second portion of the particle measurements within the scaled area of interest. The one or more computer processors may be configured to execute the executable instructions to at least cause display of a polygon bounding measurements corresponding to the second portion of the particle measurements. The one or more computer processors may be further configured to execute the executable instructions to at least: cause display of a first polygon formed by the vertices. The graphics control device may also include receive, from the first input device via the input device port, a second set of measurements for presentation via a second plot having a second scaling parameter. The graphics control device may also include generate second vertices by scaling the linear vertices using the second scaling parameter. The one or more computer processors may be further configured to cause display of a second polygon on the second plot, where the second polygon is formed by the second vertices. The one or more computer processors may be further configured to execute the executable instructions to at least: receive, from the event listener, a gate scaling event indicating new scaling parameter for the second plot; and update the scaling parameter included in the data record to identify the new scaling parameter; and update the vertices included in the data record by scaling the linear vertices using the new scaling parameter. The one or more computer processors may be further configured to execute the executable instructions to at least: receive, from the event listener, a gate movement event indicating a new location for the gate on the second plot; update the vertices included in the data record to identify the new location of the gate; and update the linear vertices included in the data record based on the new location for the gate and the scaling parameter. The innovative features described may include or be implemented by hardware, a method or process, or computer software on a computer-accessible medium.

In another innovative aspect a computer-implemented method is provided. The method is performed under control of one or more processing devices. The method includes receiving, from a first input device, gate data including vertices defining an area of interest for a first graphical plot of particle measurements; determining that the first graphical plot presents the particle measurements using a scaling parameter, where the scaling parameter identifies a non-linear scaling factor for at least on dimension of measurement included in the particle measurements; generating linear vertices for the area of interest based at least in part on the vertices and the non-linear scaling factor; and creating a data record including the scaling parameter, the vertices, and the linear vertices in association with an identifier for the area of interest. Other embodiments of the computer-implemented method include corresponding computer systems, apparatus, and computer programs recorded on one or more computer storage devices, each configured to perform the actions of the methods.

Implementations of the method may include one or more of the following features. The computer-implemented method may further include receiving, from the first input device, a gate movement event indicating a new location for the gate; updating the vertices included in the data record to identify the new location of the gate; and updating the linear vertices included in the data record based on the new location for the gate and the scaling parameter. The computer-implemented method may further include identifying a first portion of the particle measurements within the area of interest; and upon receiving the gate movement event, identifying a second portion of the particle measurements within the new location. The computer-implemented method may further include causing display of a polygon bounding measurements corresponding to the second portion of the particle measurements. The computer-implemented method may further include receiving, from the first input device, a gate scaling event indicating new scaling parameter for the first plot; updating the scaling parameter included in the data record to identify the new scaling parameter; and updating the vertices included in the data record by scaling the linear vertices using the new scaling parameter. The computer-implemented method may further include identifying a first portion of the particle measurements within a scaled area of interest; and upon receiving the gate scaling event, identifying a second portion of the particle measurements within the scaled area of interest. The computer-implemented method may further include causing display of a polygon bounding measurements corresponding to the second portion of the particle measurements. The computer-implemented method may further include causing display of a first polygon formed by the vertices. The computer-implemented method may also include receiving, from the first input device, a second set of measurements for presentation via a second plot having a second scaling parameter. The computer-implemented method may also include generating second vertices by scaling the linear vertices using the second scaling parameter. The computer-implemented method may also include causing display of a second polygon on the second plot, where the second polygon is formed by the second vertices. The computer-implemented method may further include receiving, from the first input device, a gate scaling event indicating new scaling parameter for the second plot; and updating the scaling parameter included in the data record to identify the new scaling parameter; and updating the vertices included in the data record by scaling the linear vertices using the new scaling parameter. The computer-implemented method may further include receiving, from the first input device, a gate movement event indicating a new location for the gate on the second plot; updating the vertices included in the data record to identify the new location of the gate; and updating the linear vertices included in the data record based on the new location for the gate and the scaling parameter.

The innovative features described may include or be implemented by hardware, a method or process, or computer software on a computer-accessible medium.

DETAILED DESCRIPTION

Figure 1:
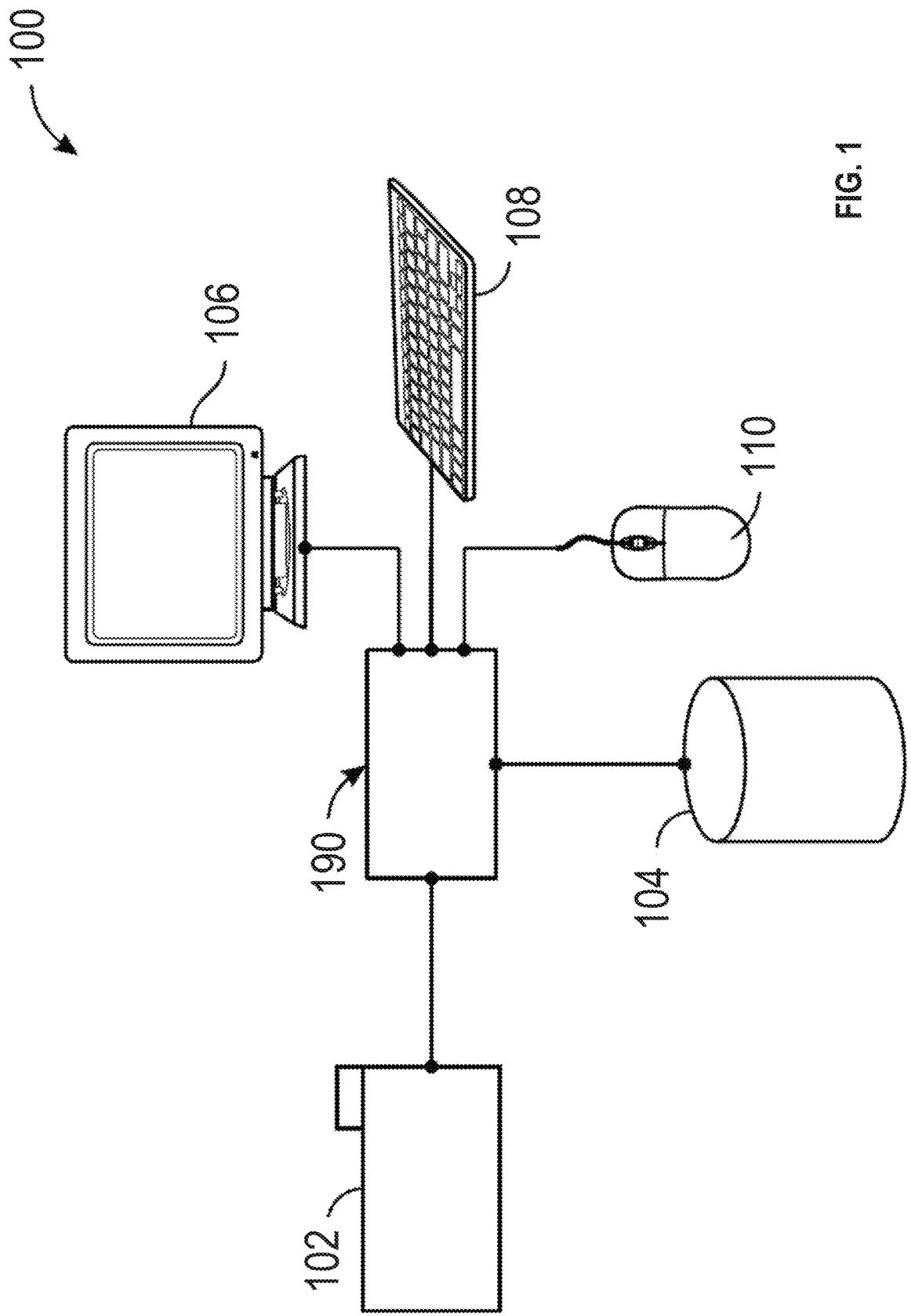
FIG. 1 shows a functional block diagram for one example of a graphics control system for that may implement one or more of the features described.

In the field of particle analysis, gating can be an important aspect of sorting and selecting populations of interest. The gate may identify characteristics of interest that can be isolated and tracked over time. For example, a researcher may wish to track whether a given compound is causing a change in a population of particles (e.g., cancer cell counts) over time. In such instances, a gate may be specified on a plot showing a first set of events taken at a first time. A subsequent experiment may be performed to collect a second set of event measurements at a second time. Meaningful analysis of the first set and second set may depend on accurate representation of the gate for both sets of measurements.

Analysis may also include parameterized non-linear scaling transformations of one or more gates. The transformations may be performed in response to activation of a user interface element or as part of the measurement collection process. Irrespective of the source of the transformations, the features described provide for an efficient and consistent representation of the events and gates related therewith. When a scaling transformation is applied to the data, the location of events in the scaled coordinate space may change based on the parameters of the transformation. In order to preserve the selection of populations, which should not depend on the specific transformation, the gate properties should be changed accordingly.

One option for preserving the selection is to leave the gate at its original coordinates in the plot. However, this can cause substantial changes as the area specified in a first scale may not have a direct correlation to the area in a second scale. Another option is to warp the gate from the first scale into a position on the second scale. However, this can cause substantial irregularities in the shape of the gate as well as increase the number of points needed to represent the gate. For example, straight lines may become curved, rectangular gates may deform to something other than a quadrilateral, or other distorted views.

In view of these limitations, the present application describes features that preserves the selection of populations while at the same time providing regularly shaped gates upon scaling. One non-limiting advantage of the features describes is maintaining the gate properties so that it may be graphically represented in a manner as if created by a user in the currently displayed scale. As noted, the number of points needed to represent a regular polygon can be less than those needed to represent an irregular shape. The features also provide a non-limiting advantage of maintaining the integrity of the population across one or more data sets.

The gating control method generally includes creating a first gate in a scaled data space. The scaling properties may be stored or associated with the gate. As the scaling parameters are changed for the gate—either manually or through automated detection—the scaled properties are continually updated to reflect the most recent changes. When gate properties are changed on a gate that applies to multiple data sets, the correct scaled properties are continuously stored with the gate for each data set, as the properties are being change interactively. The features also allow for backwards compatibility by associating current scaling parameters with a predefined gate.

The gating control may be implemented as part of a graphics system for dynamically presenting images and plots of particle measurements. In some implementations, the gating control may be implemented as part of a particle analysis system for processing plots of particle measurements and providing an output based thereon. When a user moves a gate, the user may have visually identified a desired population in the data. The parameters applied at the time the gate is moved may be persisted with the gate. This allows movement of the gate visually, such as when a change in scaling parameters is detected. The movement of the gate may not be linear movement because of the scaling parameter(s) applied. In cases where no transformation or scaling is referenced, the system may process the gate as if visually placed in the desired position for the scale. However, as the gate is manipulated further, the features described will maintain the visual and data integrity of the gate using the initial placement as the baseline which is lacking in current systems.

A gate may operate on the particle measurement data. Plots may be used to display a visualization of the gated data. Plots may display different populations using different colors. Plots may also display a visualization of the gate, or not. When analyzing particle measurement data, a researcher may start with a plot, and then create gates to identify particular particle sub-populations of interest. Once a gate is created, the plot may no longer necessary. The plot may be saved for reference, possible troubleshooting, or reused to visualize the additional or alternative parameters of interest. In some implementations, the gate may be used to select and display statistical information about the particles included within the gate. For example, the system may display the statistics on the screen, export them to a machine-readable file, or transmit them to a laboratory information system or a laboratory information management system.

The features described provide non-trivial features which automates the generation of gates from an initial form into transformed space. The raw data defining a gate may be augmented with additional statistical information to permit efficient and dynamic conversion of the gate (and populations defined thereby) in response to detected events such as a gate movement event or scaling event. For example, cut off values may be specifically generated for specified parameters to determine whether an event is within a gate or outside the gate. This provides more accurate representation of the gate particularly in cases where the gate is subjected to transformations (e.g., movement, scaling, both).

The features described overcome many of the deficiencies of existing system and obtains its objectives by providing an integrated method embodied in computer software for use with a computer for the rapid, efficient gating and manipulation of defined gates, thereby allowing for rapid, accurate, and visually consistent gate analysis to be provided in a resource efficient manner. The features include specific rules and data structures that can be applied to gates in response to detected manipulation events.

As used herein, "system," "instrument," "apparatus," and "device" generally encompass both the hardware (e.g., mechanical and electronic) and, in some implementations, associated software (e.g., specialized computer programs for graphics control) components.

As used herein, an "event" generally refers to the data measured from a single particle, such as cells or synthetic particles. Typically, the data measured from a single particle include a number of parameters, including one or more light scattering parameters, and at least one fluorescence intensity parameters. Thus, each event is represented as a vector of parameter measurements, wherein each measured parameter corresponds to one dimension of the data space. In some biological applications, event data may correspond to quantitative biological data indicating expression of a particular protein or gene.

As used herein, a "population", or "subpopulation" of particles, such as cells or other particles, generally refers to a group of particles that possess optical properties with respect to one or more measured parameters such that measured parameter data form a cluster in the data space. Thus, populations are recognized as clusters in the data. Conversely, each data cluster generally is interpreted as corresponding to a population of a particular type of cell or particle, although clusters that correspond to noise or background typically also are observed. A cluster may be defined in a subset of the dimensions, e.g., with respect to a subset of the measured parameters, which corresponds to populations that differ in only a subset of the measured parameters.

As used herein, a "gate" generally refers to a boundary identifying a subset of data (e.g., particle measurements) of interest. In biological particle analysis, a gate may bound a group of events of particular interest. The group of events may be referred to a population. Further, as used herein, "gating" may generally refer to the process of defining a gate for a given set of data such as via a user interface or plate and well selections.

FIG. 1 shows a functional block diagram for one example of a graphics control system for that may implement one or more of the features described.

A particle analyzer 102 such as a thermal cycler or a flow cytometer may be configured to acquire quantitative data for biological events. For example, particle analyzer 102 may generate flow cytometric event data. The particle analyzer 102 may include a cell sorting system such as the cell sorter system 100 shown in FIG. 1. In such embodiments, the event data may include a sorting decision for a particle. The particle analyzer 102 may be configured to provide event data to a gating controller 190. A data communication channel may be included between the particle analyzer 102 and the gating controller 190. The events may be provided to the gating controller 190 via the data communication channel.

The gating controller 190 may be configured to receive the events from the particle analyzer 102. The events received from the particle analyzer 102 may include flow cytometric event data or other quantitative biological event data. The gating controller 190 may be configured to provide a graphical display including a first plot or other visualization (e.g., wells) of events to a display device 106. The gating controller 190 may be further configured to render a gate around a population of events shown by the display device 106, overlaid upon the first plot. Additionally, the gating controller 190 may be further configured to display the events on the display device 106 within the gate differently from other events in the events outside of the gate. For example, the gating controller 190 may be configured to render the color of flow cytometric events contained within a gate to be distinct from the color of flow cytometric events outside of the gate. The display device 106 may be implemented as a monitor, a tablet computer, a smartphone, or other electronic device configured to present graphical interfaces.

The gating controller 190 may be connected to a storage device 104. The storage device 104 may be configured to receive and store information from the gating controller 190. The information may include event data and/or information about the experiment or assay performed to acquire the event data (e.g., particle analyzer used, particle analyzer configuration used, operating conditions (e.g., temperature, time), reagents used, information identifying the experimental protocol or workflow used, etc.). The storage device 104 may also be configured to receive and store event data from the gating controller 190. The storage device 104 may be further configured to allow retrieval of particle event data or information about the experiment or assay performed to acquire the event data by the gating controller 190.

A display device 106 may be configured to receive display data from the gating controller 190. The display data may comprise plots of particle event data and gates outlining sections of the plots. The display device 106 may be further configured to alter the information presented according to input received from the gating controller 190 in conjunction with input from the particle analyzer 102, the storage device 104, the keyboard 108, and/or a mouse 110.

The gating controller 190 may be configured to receive a selection signals identifying activation of a control element such as a button, drawing of a gate, or keyboard input from a first input device. For example, the input device may be implemented as the mouse 110. The mouse 110 may initiate a gate selection signal to the gating controller 190 identifying the gate to be displayed on or manipulated via the display device 106 (e.g., by clicking on or in the desired gate when the cursor is positioned there). If the visualizations include a well display, selection of particular wells may be included in the gate selection signal.

The first and second input devices may be implemented as one or more of the mouse 110, a keyboard 108, or other means for providing an input signal to the gating controller 190 such as a touchscreen, a stylus, an optical detector, or a voice recognition system. Some input devices may include multiple inputting functions. In such implementations, the inputting functions may each be considered an input device. For example, as shown in FIG. 1, the mouse 110 may include a right mouse button and a left mouse button, each of which may generate a triggering event.

The triggering event may cause the gating controller 190 to alter the manner in which the data is displayed or which portions of the data is actually displayed on the display device 106 or both at the same time.

In some embodiments, the gating controller 190 may be configured to detect when gate selection is initiated by the mouse 110. The gating controller 190 may be further configured to automatically modify one or more interface elements to respond to the selection/input as described. The alteration may include loading event data from a specified source and presenting a user interface showing event data or selections therefor.

The gating controller 190 may receive adjustments that change the way a plot is displayed. For example, the scaling applied to at least one dimension displayed on via the plot. In one example, an initial plot may render values in the x and y dimensions using a logarithmic scale. A user may activate a control element on the interface to change the scaling of the values. In some systems, the gate may not be adjusted according to the scaling values. In such instances, the populations defined by the gate in the scaled plot may not be accurate due to a change in the underlying parameter scaling. In some systems, a universal scaling may be applied to the gate. However, this too may provide inaccurate representation of the population due to the non-linearity of values in the initial plot at the time the original gate was defined.

The problem of accurate representation can be compounded in cases where event data and gates are loaded from a storage device. In such instances, the gating controller 190 presenting the event data and gates may not be the same device used to create the gates. As such, the configuration of the display at the time of loading may be different than the configuration used when the gate was defined.

Another issue may arise when displaying parallel plots for two or more data sets. Some researchers may compare event data to determine, for example, whether a patient has responded to treatment overtime or whether two patients may be expressing similar conditions. As the data sets and gates may be generated at different times, using different particle analyzers, when the data sets are presented, it may be desirable to ensure those sets and gates displayed are shown in a consistent fashion (e.g., similar parameters at similar scale) to facilitate a comparison between equivalent values.

Figure 2:
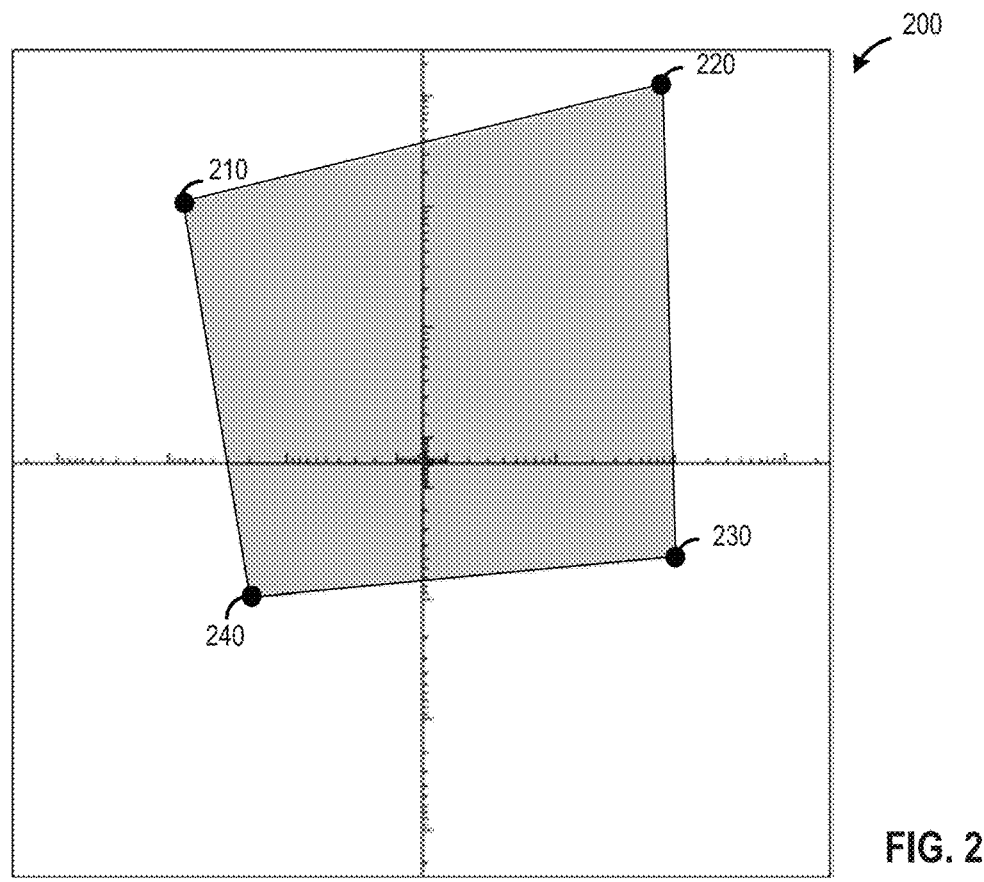
FIG. 2 shows an initial plot using a biexponential scaling.

FIG. 2 shows an initial plot using a logarithmic scaling. The initial plot 200 includes a shaded area representing a gated area of interest or region of interest. This area may be used by a particle analyzer for sorting events within the gated area into a specific collection receptacle (e.g., a well on a collection plate). The area may be defined using four points (e.g., point 210, point 220, point 230, and point 240). In some implementations, the area may be defined using fewer or more points to provide more or less complex area definitions. The points may be specified in a sequence such that it is implied that after the last point in the sequence the gate boundary returns to the first point in the sequence. When storing information identifying the gate, the gate, or each point, may be stored with additional information indicating the scaling applied at the time the gate was defined.

Figure 3:
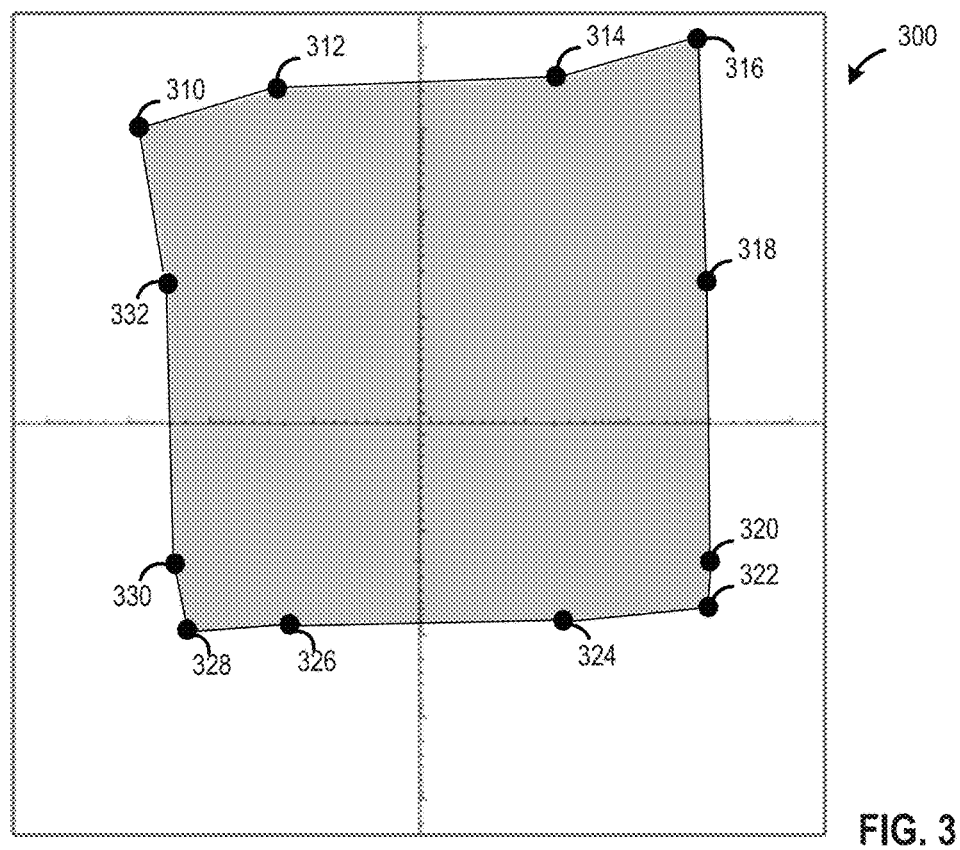
FIG. 3 shows a scaled version of the initial plot shown in FIG. 2.

FIG. 3 shows a scaled version of the initial plot shown in FIG. 2. In the scaled plot 300, the x and y axes have been transformed. As part of this transformation, the area defining the region of interest has changed shape from a rectangular shape in FIG. 2 to an irregular polygon shown in FIG. 3. The area on the scaled plot 300 is now defined by twelve points labeled as points 310, 312, 314, 316, 318, 320, 322, 324, 326, 328, 330, and 332. The features described provide a mechanism for efficiently transitioning from presentation of the initial plot 200 to the scaled plot 300 to provide a consistent representation of the events and areas of interest.

Figure 4:
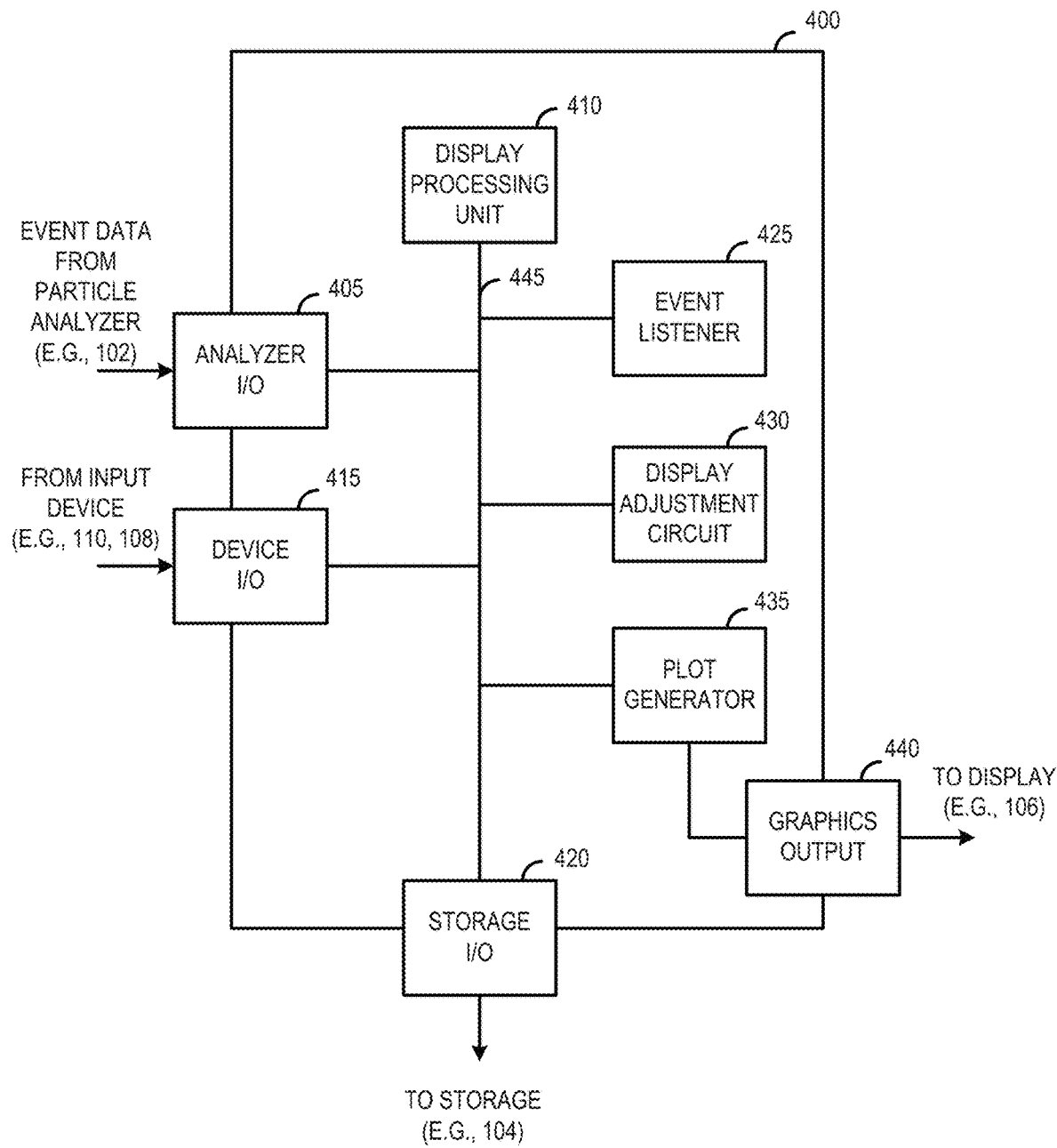
FIG. 4 shows a functional block diagram for one example of a graphics control system for that may implement one or more of the features described.

FIG. 4 shows a functional block diagram for one example of a graphics control system for that may implement one or more of the features described. The gating controller 400 shown in FIG. 4 may be included in the system 100 shown in FIG. 1. The gating controller 400 may be implemented as a specially configured device for accurately scaling non-linear gates to other linear or non-linear formats. In some implementations, the gating controller 400 may be integrated with the particle analyzer 102, the display device 106 (e.g., tablet computer, laptop computer, desktop computer), or other electronic hardware.

The gating controller 400 includes an analyzer input/output (I/O) interface 405. The analyzer input/output interface 405 is configured to receive event data from a particle analyzer, such as a flow cytometer. The analyzer I/O interface 405 may be a hardware interface providing a path for the event data to be received by the gating controller 400. For example, the analyzer input/output interface 405 may be implemented as a network interface, a Universal Serial Bus interface, a serial data communication interface, memory access device, or other machine-to-machine communication interface. The data may be received in a standardized, machine readable format such as a comma separated list, a token separated list, mark-up language document, or a spreadsheet.

The particle event data received by the gating controller 400 via the analyzer input/output interface 405 may be stored in a storage device such as the storage device 104 shown in FIG. 1. The gating controller 400 may include a storage input/output (I/O) interface 420 to facilitate storage and retrieval of data to and from a storage device. For example, the storage I/O interface 420 may be implemented as a network interface, a Universal Serial Bus interface, a serial data communication interface, memory access device, or other machine-to-machine communication interface. In some implementations, the storage I/O interface 420 may be configured to generate queries to retrieve information requested by an element of the gating controller 400. Such queries may be in a standardized query language such as Structured Query Language (SQL). In some implementations, the storage I/O interface 420 may be configured to generate storage commands to persist data in the storage device. SQL update or insert commands are examples of storage commands generated by the storage I/O interface 420.

A display processing unit 410 is shown in FIG. 4. The display processing unit 410 coordinates the activities of the gating controller 400. For example, the display processing unit 410 may receive a signal that data has been received via the analyzer I/O interface 405. Upon detecting the signal, the display processing unit 410 may transmit an instruction to route the data to the storage I/O interface 420 for storage. The display processing unit 410 may coordinate the activities according to a preconfigured set of machine readable instructions.

The gating controller 400 shown in FIG. 4 also includes a device input/output (I/O) interface 415. The device I/O interface 415 receives signals from input devices such as a mouse or keyboard. The display processing unit 410 may detect an input signal, such as a scaling signal, and adjust a display according to one or more of the described aspects. One input signal may include a message to begin displaying event data. The input signal may include an identifier for the experiment for which data should be displayed. Using this identifier, the event data may be retrieved such as via the storage I/O interface 420 or from the particle analyzer via the analyzer I/O interface 405.

An event listener 425 may be included in the gating controller 400 to monitor the signals received via the device I/O interface 415. The event listener 425 may be configured such that signals from input devices may be translated into graphics adjustments. The gating controller 400 may include multiple event listeners 425 to account for different system contexts. For example, a key press before any event data is displayed may be used to trigger loading of data. However, once data is initially displayed, the same key press event may cause a different system response, such as application of a specific scaling transformation.

The event listener 425 may include a registry of events and corresponding graphics control functions (e.g., transformations) to trigger upon detection of the event. For example, the event listener 425 may be configured to detect a keystroke (e.g., control key pressed with the "L" key and the "H" key). The event listener 425 may be contextually aware. For example, the keystroke may trigger the graphics control function when detected in conjunction with another input signal (e.g., mouse selection, mouse location), system state (e.g., power on, plugged-in), data state (e.g., cytometry data loaded), display state (e.g., plot displayed, type of plot currently displayed), or the like. The registry may be persisted in memory and accessed by the event listener 425.

Upon detecting an input event and identifying a system response, the event listener 425 may transmit an instruction to the appropriate element or elements of the gating controller 400. For example, if the event indicates receipt of event data, the event listener 425 may transmit a message to the storage I/O interface 420 to initiate storage of the received event data.

In some implementations, it may be advantageous to allow the display processing unit 410 to coordinate the system responses to detected events. This may be useful where multiple input signals may be received and arbitration is necessary to determine the order in which the events should be acted upon. The display processing unit 410 may be configured to manage the state changes using a state machine to represent the current status of the gating controller 400 and possible next states.

Some events detected by the event listener 425 may be graphics control events. A display adjustment circuit 430 may be included to coordinate the adjustment of the graphic display of events from the current state to the adjusted state. The display adjustment circuit 430 may adjust the number of events displayed, the color of one or more events displayed, a plot type to use for displaying the events, the zoom level for the display, scaling, or the like. The adjustment may also include updating the gate scaling parameters to maintain visual and data integrity of the population identified by the gate.

The display adjustment circuit 430 may transmit the adjustments and an identification of the events to display to a plot generator 435. The plot generator 435 may in turn generate a computer displayable graphic representation of the event data according to the adjustments. The representation may then be provided to a display via a graphics output interface 640. The graphics output interface may be a video graphics array (VGA) interface, a high definition multimedia interface (HDMI), a wired or wireless network interface, or other communication means configured to provide graphics data, directly or indirectly, to a display device. In some implementations, the plot generator 435 may be configured to further select events to display based on the display adjustment(s) being applied.

The elements included in the gating controller 400 may be coupled by a bus 445. The bus 445 may be a data bus, communication bus, or other bus mechanism to enable the various components of the gating controller 400 to exchange information. It will further be appreciated that while different elements have been shown, multiple features may be combined into a single element, such as the display adjustment circuit 430 and the plot generator 435. Furthermore, additional elements may be included in the gating controller 400 to support the features described. For example, a power source is not shown but may be included to provide power for the gating controller 400. This can allow the gating controller 400 to operate as a standalone graphics control hub to receive data from one or more analyzers, receive inputs from one or more input devices, and provide graphics to one or more display sources.

The methods below describe how the visual and data integrity is maintained for different situations. For example, when a user creates a new gate, the user may select, via a graphical user interface, the type of gate they want to create (ex: rectangle, polygon, quad, etc.). The user may also select the vertices on the plot where the gate should be, selecting the desired population(s). To maintain consistency for the gate, features are provided to associate the current scaling parameters and selected vertices with the gate. The gate may then use the scaling parameters and selected vertices to calculate the location of the vertices in linear space, enabling future scaling when the parameters change Another user action may include changing the scaling parameters for a plot. In this instance, the new scaling parameters may be received and used to generate new scaled vertices using the linear vertices. Using the scaled vertices, the population of interest may then be identified. A final update of the information defining the gate may be performed to store the newly calculated vertices.

Some gates may be generated automatically based on location and surrounding data. For example, auto population detection features may identify clusters of events which may be related. In such instances, when a user changes the scaling parameters for the plot including a generated gate, the new scaling parameters may be received and used to generate new scaled location using the linear location. Using the scaled location and surrounding data, an outline for the generated gate may be identified. The new population may then be associated with the generated gate. A final update of the information defining the gate may be performed to store the newly calculated location.

Another user action may include moving a gate shown on a plot. In this instance, the gate may be moved in scaled space. This may necessitate an update to the scaled vertices defining the gate. A first set of new linear vertices may be generated based on the current (unchanged) scaling parameters. The vertices associated with the moved gate may be used to calculate the population selected through moved gate on the visual interface. The information defining the gate may be updated to include the new linear vertices.

In some implementations, a user may move the gate on a first plot and request application of the gate to multiple data files with different parameters. For example, the user may have a plot with two parameters (A and B) on data file (DF1) with a gate named P1. The user may add another data file, DF2, to their worksheet such as by selecting an import control element to load measurement data from DF2. Once loaded, the user may include another A-B plot to display DF2. Assume here that DF2 has different scaling parameters associated with the A and B parameters. This may be performed to make the data in DF2 appear according to a user preference. With both data files being presented, the user may select the gate P1 for display on the plot for DF2. 5. To ensure consistency between the presentations of the data files which have different scaling parameters associated with the parameters A and B, features are provided to first take the linear vertices that were defined for P1 and the scaling parameters defined on DF2 to automatically calculate where P1 should be displayed on the plot for DF2. If the user decides to move P1 (either on the plot for DF1 or DF2) to better capture their population, as the user moves P1 on one plot (DF1 or DF2), P1 on the other plot will automatically display and move in the correct scale for that data file as the system continuously calculates the new scaled vertices based on the shared linear vertices and the scaling parameters for the correct data file.

Figure 5:
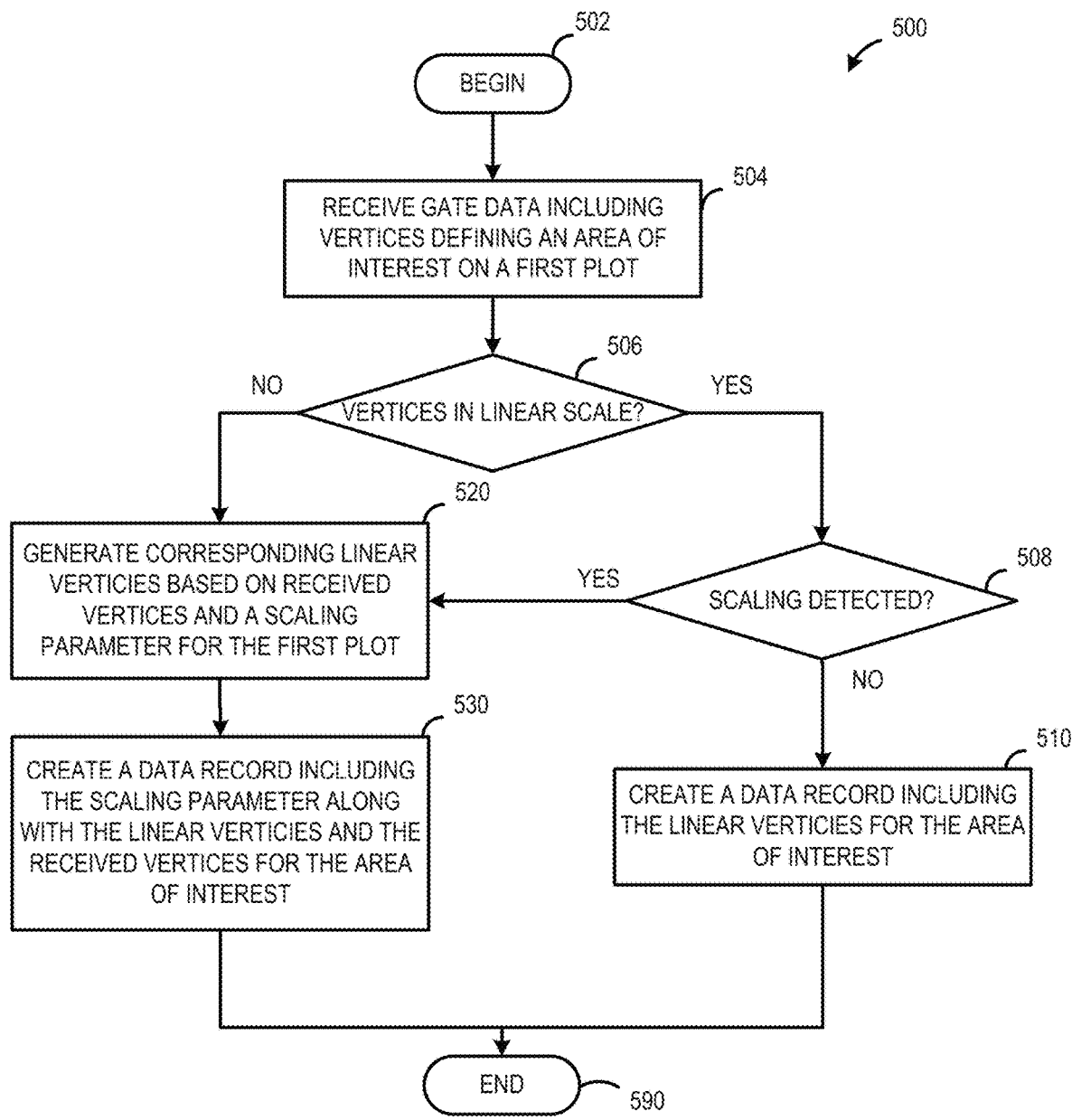
FIG. 5 shows a process flow diagram of a method of defining a scalable gate.

FIG. 5 shows a process flow diagram of a method of defining a scalable gate. The method 500 may be performed by a controlling device. The controlling device may be one or more of the devices described such as the gating controller 190 shown in FIG. 1 or the gating controller 400 shown in FIG. 4.

The method 500 begins at block 502. At block 504, the controlling device receives gate data. The gate data includes a set of vertices on a first plot. The set of vertices represent a gate associated with a region of interest on the first plot. The set of vertices may be associated with a new gate or with an adjustment to a previously defined gate. The gate data may include information for scaling, if any, applied to the vertices of the initial plot when the gate was drawn. For example, if the vertices were drawn on a linear scaled plot, the transformation indicated in the input information may include an identifier for the linear scaling applied. In some implementations, the controlling device may establish a graphics session. The graphics session may represent a series of communications between the controlling device and a display device. The session may be associated with a state indicating the configuration of the display. The configuration may include the parameters displayed, the particle data source (e.g., file name), presentation configuration (e.g., color scheme, icons to use for displaying particle event data points, resolution, etc.), or scaling.

At block 506, the controlling device may determine whether the set of vertices were specified in a linear scale. The determination may be based at least in part on the data received at block 504 and/or session information stored by the controlling device.

If the vertices were not received in a linear scale, the method 500 proceeds to block 520. At block 520, the controlling device may generate linear vertices corresponding to the scaled vertices received at block 504. The linear vertices may be generated by applying a transformation from the scaled vertices to a linear scale using the scaling parameter applicable to the set of vertices.

At block 530, the controlling device may generate a data record including the scaling parameter along with the linear vertices generated at block 520. The data record may also include the set of vertices received at block 504. In this way, the data record captures both the gate as defined by the user and a basic linear representation of the vertices. This basic linear representation may be used to expedite subsequent graphics display of the gate according to alternate scaling configurations which accurately correspond to the original set of vertices. The data record may be created in a data store or included in a message transmitted for further processing (e.g., to a sorting particle analyzer, cloud storage, analytic network service, etc.). In cases where the gate is being altered, creating the data record may include updating an existing data record with the new vertices or scaling parameter or deleting the existing data record and creating a new data record with the updated information.

Returning to block 506, if the controlling device determines that the vertices are in a linear scale, the method 500 continues to block 508. At block 508 a determination is made as to whether any scaling in detected. A gate may be defined for a plot based on a scaled view of the events. If scaling is detected, the method 500 may proceed to block 520 as described above to create a data record that accounts for the scaling applied for the set of vertices. If the determination at block 508 is negative, at block 510, the controlling device may create a data record including the linear vertices identifying the area of interest. Since no scaling (linear or otherwise) was applied, the data record may omit any scaling parameters or additional representations of the gate in the data record. This omission may conserve resources in both processing the gate and storing the gate by keeping only the linear vertices until such time more complex representations are needed. The data record may be created in a data store or included in a message transmitted for further processing (e.g., to a sorting particle analyzer, cloud storage, analytic network service, etc.). In cases where the gate is being altered, creating the data record may include updating an existing data record with the new vertices or scaling parameter or deleting the existing data record and creating a new data record with the updated information.

The method 500 may end at block 590. However, the method 500 may be repeated to update the data record in response to an adjustment to the gate. The adjustment may be one example of an event that is detected by the controlling device and used to initiate the method 500. The data record may be implemented using a markup language such as XML. In some implementations, the data record may be an entry in a data store such as a record in a relational database. The data record may be implemented using an object notation or other machine readable format such as JAVASCRIPT object notation (JSON).

Figure 6:
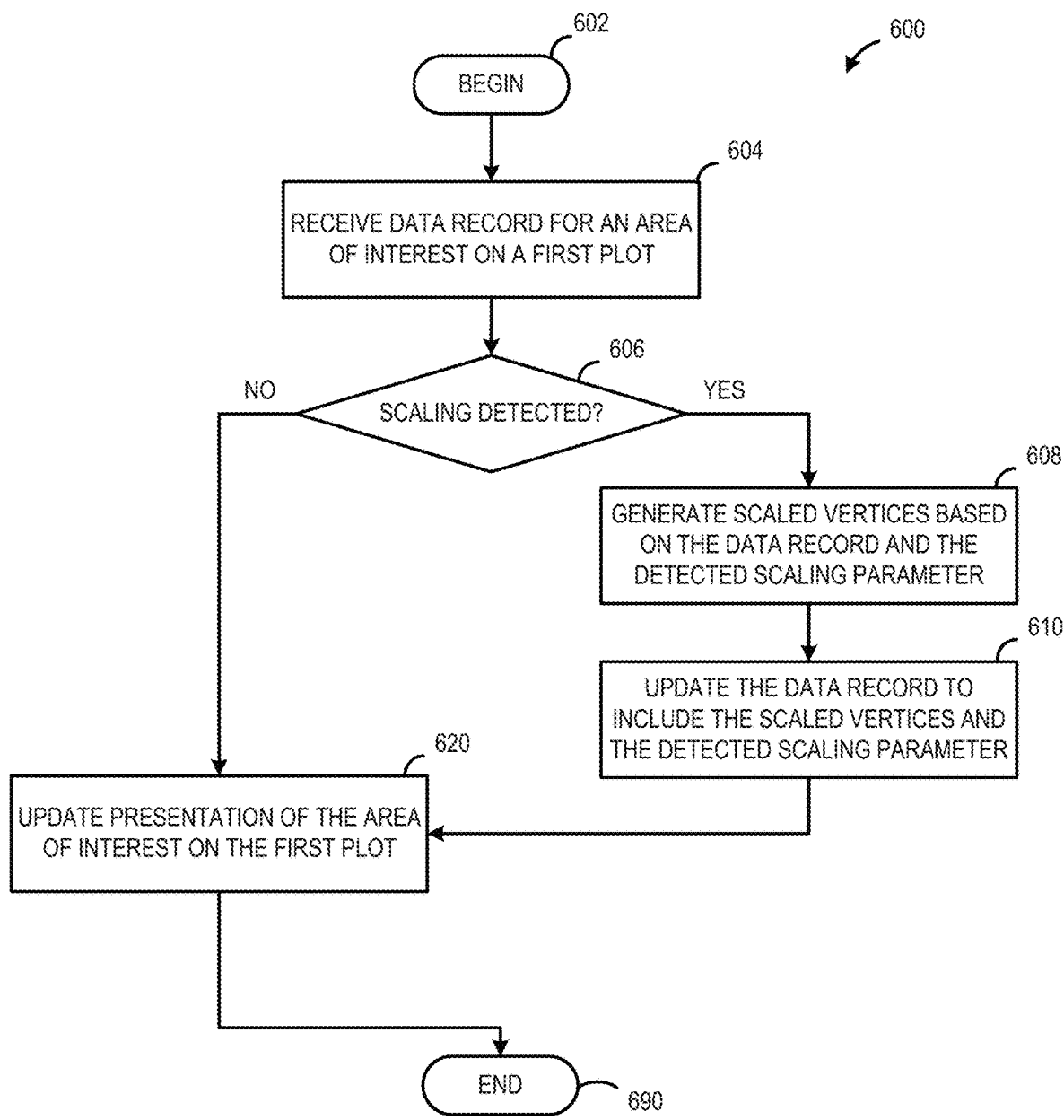
FIG. 6 shows a process flow diagram of a method of updating the presentation of a scalable gate in response to detecting a scaling event.

FIG. 6 shows a process flow diagram of a method of updating the presentation of a scalable gate in response to detecting a scaling event. The method 600 may be performed by a controlling device. The controlling device may be one or more of the devices described such as the gating controller 190 shown in FIG. 1 or the gating controller 400 shown in FIG. 4. The method 600 is one example of how a gate defined by the method 500 of FIG. 5 may be presented when a change in scale is detected.

The method 600 begins at block 602. At block 604, the controlling device receives a data record for an area of interest on a first plot. The data record may include a set of vertices representing a gate associated with a region of interest on the first plot. The gate data may include information for scaling, if any, applied to the vertices of the first plot. The data record may be specified by information received from a display device. The information may include an experiment or assay identifier that can be used to retrieve the data record.

At block 606, the controlling device may determine whether scaling is detected. The scaling may be detected based on a current state of a display session. For example, the user may have previously provided scaling information to the controlling device during the display session. As another example, the user may have a preference setting indicating a default scaling to apply when presenting event data. Scaling may be detected as an event. For example, an input device may transmit a message to the controlling device. The message may indicate a scaling event which may include the specific scaling type or other parameters to apply.

If no scaling is detected at block 606, the presentation of the area of interest may be updated to reflect the gated region specified in the data record at block 620. Updating may include causing a graphic overlay representing the region of interest on the first plot. In some implementations, the updating may include transmitting a message including the gate information to a display device. The display device may translate the message from coordinate space to display space based on the display settings.

At block 606, if scaling is detected, at block 608, the controlling device may generate scaled vertices based at least in part on the data record and the detected scaling parameter. Scaling may be within linear space or from linear space to non-linear space.

At block 610, the controlling device may update the data record to include the scaled vertices generated at block 608 along with the scaling parameter used to generate the scaled vertices. The updated data record makes both linear and scaled vertices available for presenting the area of interest. Once the data record is updated, the method 600 may continue to block 620 as described above.

The method 600 may end at block 690. However, the method 600 may be repeated to update the display of the gate or another gate.

Figure 7:
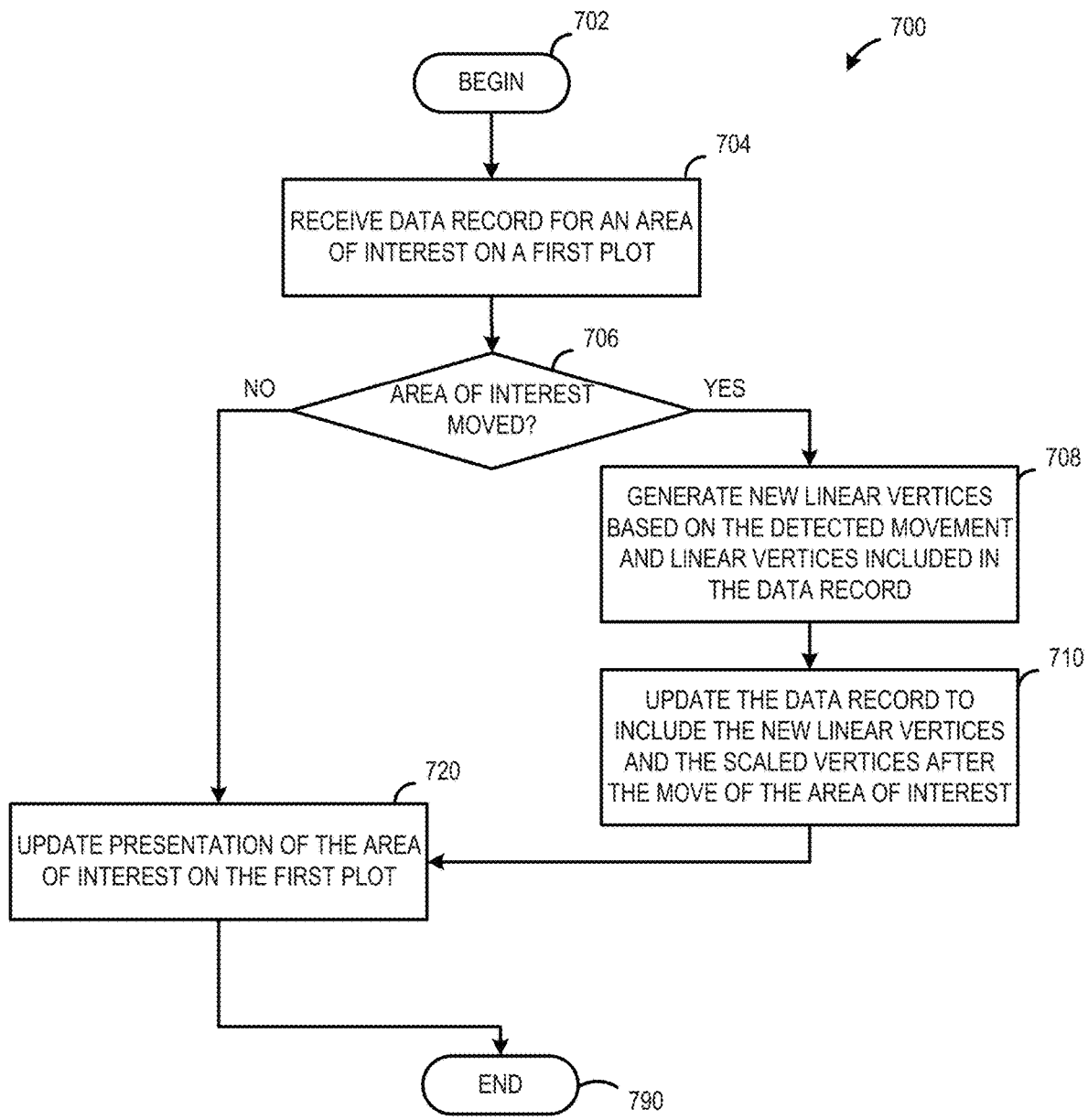
FIG. 7 shows a process flow diagram of a method of updating the presentation of a scalable gate in response to detecting a movement event.

FIG. 7 shows a process flow diagram of a method of updating the presentation of a scalable gate in response to detecting a movement event. The method 700 may be performed by a controlling device. The controlling device may be one or more of the devices described such as the gating controller 190 shown in FIG. 1 or the gating controller 400 shown in FIG. 4. The method 700 is one example of how a gate defined by the method 500 of FIG. 5 may be presented when a change in the area of interest is detected. For example, the area of interest may be moved. When moving the gate, the shape and size of the area may not change, but the range of values included within the area defined by the gate may change.

The method 700 begins at block 702. At block 704, the controlling device receives a data record for an area of interest on a first plot. The data record may include a set of vertices representing a gate associated with a region of interest on the first plot. The gate data may include information for scaling, if any, applied to the vertices of the first plot. The data record may be specified by information received from a display device. The information may include an experiment or assay identifier that can be used to retrieve the data record.

At block 706, the controlling device may determine whether the area of interest has been moved. The movement may be detected as an event. For example, an input device may transmit a message to the controlling device. The message may indicate movement of the gate from a first location to a second location within the first plot.

If no movement is detected at block 706, the presentation of the area of interest may be updated to reflect the gated region specified in the data record at block 720. Updating may include causing a graphic overlay representing the region of interest on the first plot. In some implementations, the updating may include transmitting a message including the gate information to a display device. The display device may translate the message from coordinate space to display space based on the display settings.

At block 706, if movement is detected, at block 708, the controlling device may generate new linear vertices based at least in part on the data record and the detected movement. If scaling is also applied to the first plot, the linear vertices may also be generated based on the scaling parameter applied to the first plot at the time the movement was detected. Scaling may be within linear space or from linear space to non-linear space.

At block 710, the controlling device may update the data record to include the new linear vertices and new scaled vertices defining the area of interest. If applicable, the scaling parameter used to generate the scaled vertices may also be included in the updated data record. The updated data record makes both linear and scaled vertices available for presenting the area of interest. Once the data record is updated, the method 700 may continue to block 720 as described above.

The method 700 may end at block 790. However, the method 700 may be repeated to update the display of the gate or another gate that is moved.

As noted above, some interfaces may concurrently present two or more plots. In such instances, it may be desirable to detect the movement of a gate on a first plot and apply a corresponding movement to a related gate shown on a second plot.

Figure 8:
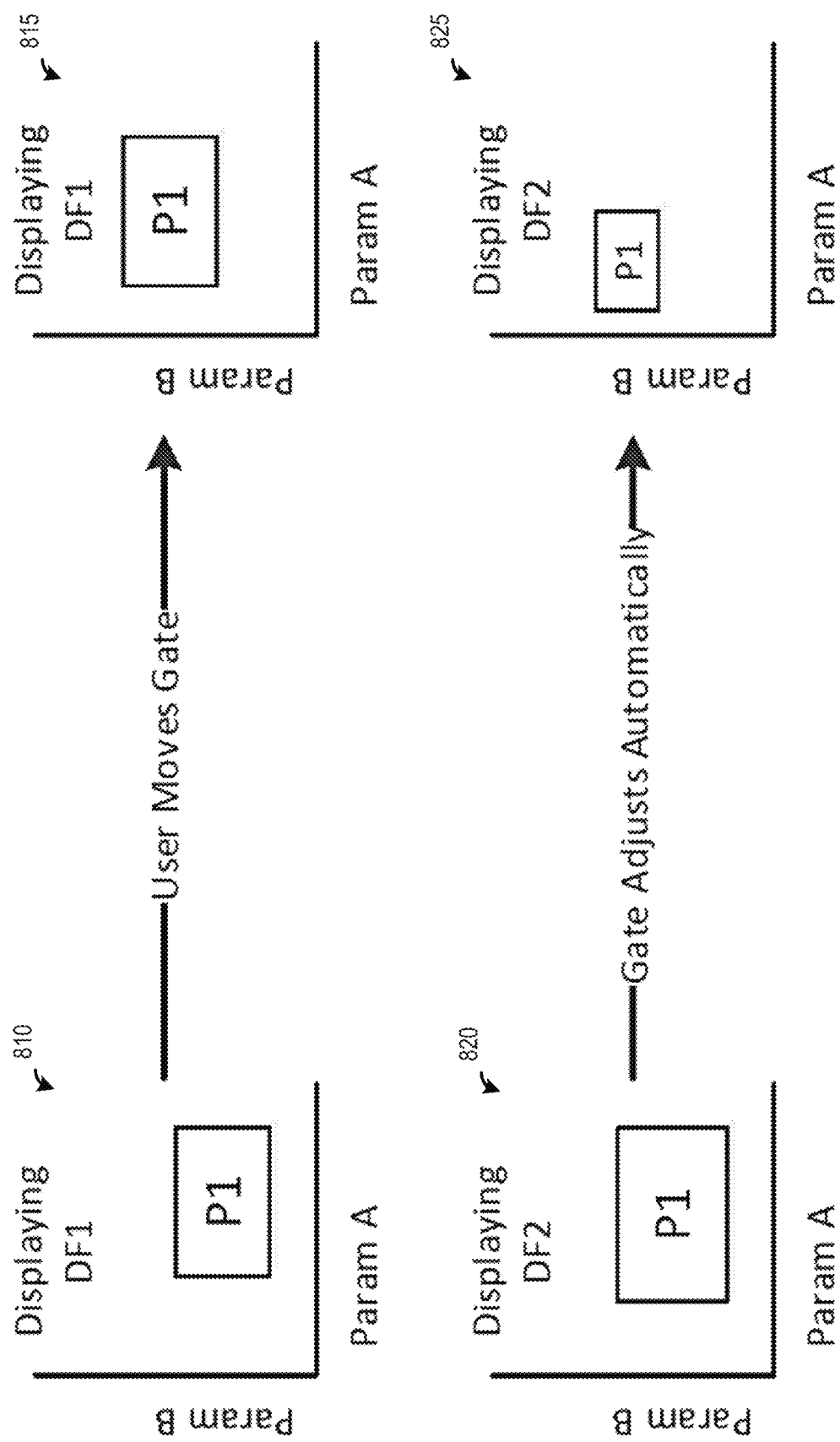
FIG. 8 depicts a how the presentation of two plots may be coordinated.

FIG. 8 depicts a how the presentation of two plots may be coordinated. A first plot 810 may be generated based on a first data record. A second plot may be generated based on a second data record. Both plots include an area of interest P1. Using an input device, a user may select and move a first gate P1 on the first plot 810. This may result in an updated first plot 815 being presented. The gating controller may detect this movement and apply a corresponding adjustment to the second plot 820 to provide an updated second plot 825. As shown, the updated second plot 825 may not be a simple movement of the P1 gate shown in the second plot 820. The area of interest represented by the P1 gate as shown in the updated second plot 825 is smaller than the area in the second plot 820. While FIG. 8 presents the plots using an exaggerated scaling, the concept illustrates that when a gate is moved so it is over a particular range of data from the first data record, the system may move the gate associated with the second data record so it encompasses a range of data in the second data record that corresponds with the particular range of data from the first data record. For example, if the data is scaled radically differently on the second plot 825 as compared to the first plot 810, the size of the gates, when rendered on an interface, may appear to be radically different. However, in terms of the underlying event data (e.g., particle measurements), the ranges of values included for both records will align.

Figure 9:
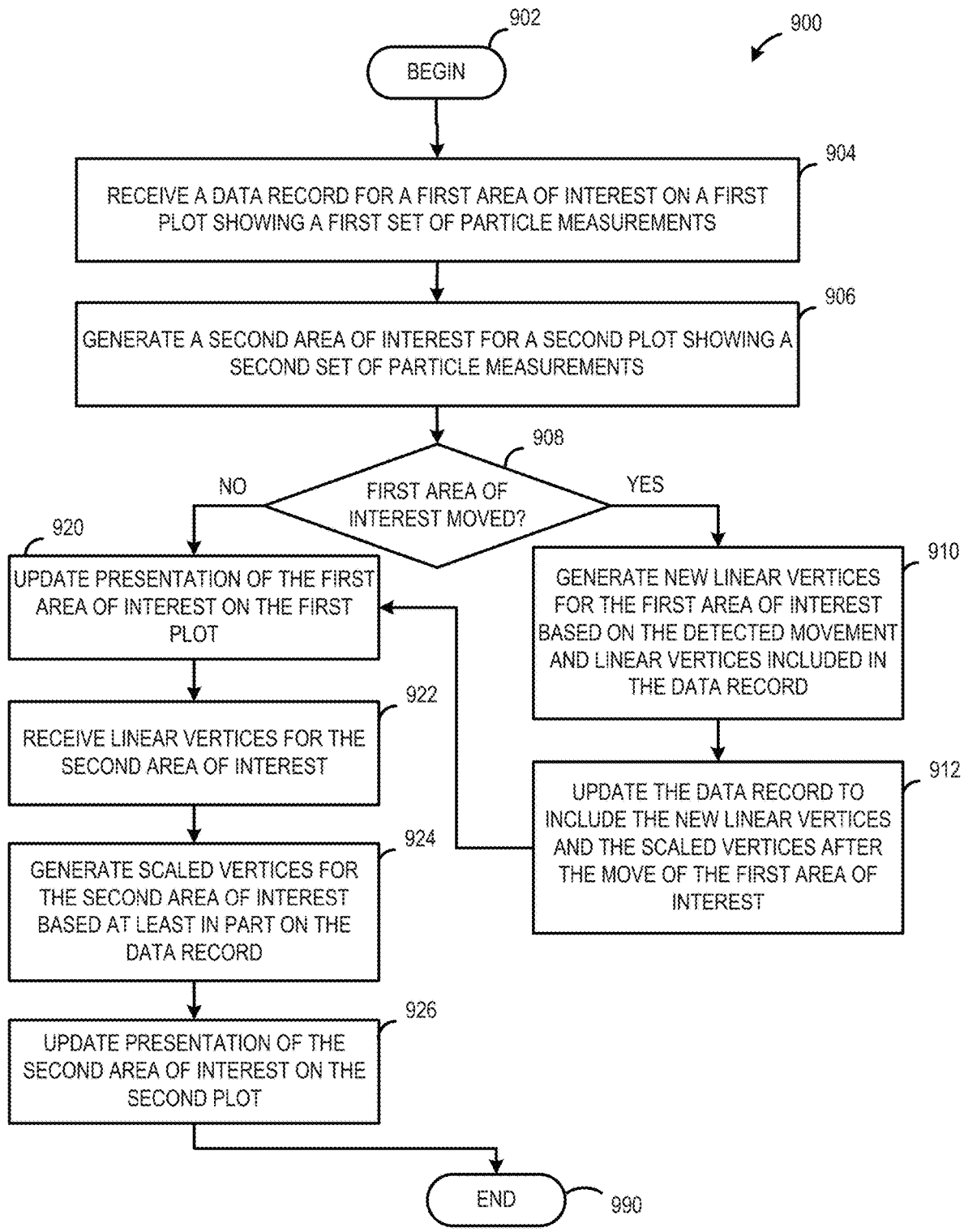
FIG. 9 shows a process flow diagram of a method of coordinated presentation of scalable gates.

FIG. 9 shows a process flow diagram of a method of coordinated presentation of scalable gates. The method 900 may be performed by a controlling device. The controlling device may be one or more of the devices described such as the gating controller 190 shown in FIG. 1 or the gating controller 400 shown in FIG. 4. The method 900 is one example of how gates, such as those defined by the method 500 of FIG. 5, associated with different data sets may be presented. The presentation features of FIG. 9 coordinate between multiple plots such that when a change in a first area of interest on a first plot is detected, a corresponding adjustment is applied to a second area of interest on a second plot. For example, the area of interest may be moved. When moving the gate, the shape and size of the area may not change, but the range of values included within the area defined by the gate may change. When performing comparative analysis of data sets, it may be desirable to provide an accurate and coordinated display of the gates.

The method 900 begins at block 902. At block 904, the controlling device receives a data record for a first area of interest on a first plot. The data record may include a set of vertices representing a gate associated with a region of interest on the first plot. The gate data may include information for scaling, if any, applied to the vertices of the first plot. The data record may be specified by information received from a display device. The information may include an experiment or assay identifier that can be used to retrieve the data record.

At block 906, the controlling device may generate a second area of interest for a second plot showing particle measurements from a second set of data. The second set of data may be identified through an input value provided to the controlling device. The input value may include a file identifier, assay identifier, or other information to facilitate identification of the specific data set to present on the second plot. The second area of interest may be generated based at least in part on the range of measurements included in the first area of interest.

At block 908, the controlling device may determine whether the first area of interest has been moved. The movement may be detected as an event. For example, an input device may transmit a message to the controlling device. The message may indicate movement of the gate from a first location to a second location within the first plot.

If no movement is detected at block 920, the presentation of the area of interest may be updated to reflect the gated region specified in the data record at block 920. Updating may include causing a graphic overlay representing the region of interest on the first plot. In some implementations, the updating may include transmitting a message including the gate information to a display device. The display device may translate the message from coordinate space to display space based on the display settings.

Having presented the first area of interest on the first plot for the first data set, the method 900 may continue at block 922 to receive linear vertices for the second area of interest. In some instances, the comparison data set may not have been processed in the same manner as the first set of particle measurements. As such, the data record including both linear and scaled vertices may not be available for the comparison particle data. The linear vertices may be received from the display device or generated by the controlling device based at least in part on the data record for the first area of interest.

At block 924, the controlling device may generate scaled vertices for the second area of interest based at least in part on the data record for the first area of interest. The scaled vertices may be generated to ensure that the second area of interest corresponds to the first area of interest. Because each plot may be presented using different scaling factors, the generation of scaled vertices at block 924 ensures that the area of interest shown on the second plot is analogous to the moved area of interest shown in the first plot.

At block 926, the presentation of the second area of interest may be updated to reflect the gated region associated with the scaled vertices generated at block 924. Updating may include causing a graphic overlay representing the region of interest on the second plot. In some implementations, the updating may include transmitting a message including the gate information to a display device. The display device may translate the message from coordinate space to display space based on the display settings.

The method 900 may end at block 990. However, the method 900 is repeatable to detect further movements of an area of interest shown on the first or second plot for the data sets or a newly identified data set. Furthermore, the method 900 may be used to coordinate display of more than two data sets using similar features described.

Returning to block 908, if the first area of interest has been moved, at block 910, the controlling device may generate new linear vertices for the first area of interest. The new linear vertices may be generated based on the scaling parameter(s), if any, applied to the first plot and the linear vertices included in the data record received at block 904. Scaling may be within linear space or from linear space to non-linear space.

At block 912, the controlling device may update the data record to include the new linear vertices and new scaled vertices defining the area of interest. If applicable, the scaling parameter used to generate the scaled vertices may also be included in the updated data record. The updated data record makes both linear and scaled vertices available for presenting the area of interest. Once the data record is updated, the method 900 may continue to block 920 as described above.

Further Embodiments

Aspects of the description may focus on flow cytometers and flow cytometry event data. In some embodiments, the event data may correspond to other quantitative biological data indicating expression of a particular protein or gene. For example, the event data may indicate the presence of an mRNA sequence within a cell or across a mixed population of cells. The event data may identify an absolute number of gene transcripts of a transcriptome for a cell or cells. Presentation of the event data may be adjusted per cell or per gene expression to provide different perspectives on populations of event data of particular interest (e.g., associated with a particular mRNA sequence, taken from a specific cell, etc.). The event data may be generated using massively parallel single cell analytic features such as those described in U.S. Pat. No. 9,567,645 which is hereby incorporated by reference in its entirety. One commercially available single-cell analysis system is the Becton, Dickinson Rhapsody™ hardware by Becton, Dickinson and Company of Franklin Lakes, N.J. The features discussed may be applied to visualize or gate events related to gene expression.

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface, an interface, or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (e.g., send or receive data) in accordance with one or more of the aspects described.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service or a data storage device.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as specifically programmed event processing computers, wireless communication devices, or integrated circuit devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable medium may be a non-transitory storage medium. The techniques additionally, or alternatively, may be realized at least in part by a computer-readable communication medium that carries or communicates program code in the form of instructions or data structures and that can be accessed, read, and/or executed by a computing device, such as propagated signals or waves.

The program code may be executed by a specifically programmed graphics processor, which may include one or more processors, such as one or more digital signal processors (DSPs), configurable microprocessors, an application specific integrated circuits (ASICs), field programmable gate arrays (FPGAs), or other equivalent integrated or discrete logic circuitry. Such a graphics processor may be specially configured to perform any of the techniques described in this disclosure. A combination of computing devices, e.g., a combination of a DSP and a microprocessor, a plurality of microprocessors, one or more microprocessors in conjunction with a DSP core, or any other such configuration in at least partial data connectivity may implement one or more of the features describe. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a specialized graphic control card.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A gating control device for processing particle measurements, the gating control device comprising:
    an input device port configured to receive messages from input devices;
    an event listener in data communication with the input device port, the event listener configured process the messages received from the input devices;
    a computer-readable memory storing executable instructions; and
    one or more computer processors in communication with the computer-readable memory, wherein the one or more computer processors are configured to execute the executable instructions to at least:
        receive, from a first input device via the input device port, gate data including vertices defining an area of interest for a first graphical plot of particle measurements;
        determine that the first graphical plot presents the particle measurements using a scaling parameter, wherein the scaling parameter identifies a non-linear scaling factor for at least one dimension of measurement included in the particle measurements;
        generate linear vertices for the area of interest based at least in part on the vertices and the non-linear scaling factor; and
        create a data record including the scaling parameter, the vertices, and the linear vertices in association with an identifier for the area of interest.

2. The gating control device of claim 1, wherein the one or more computer processors are further configured to execute the executable instructions to at least:
    receive, from the event listener, a gate movement event indicating a new location for the gate;
    update the vertices included in the data record to identify the new location of the gate; and
    update the linear vertices included in the data record based on the new location for the gate and the scaling parameter.

3. The gating control device of claim 2, wherein the one or more computer processors are further configured to execute the executable instructions to at least:
    identify a first portion of the particle measurements within the area of interest; and
    upon receiving the gate movement event, identify a second portion of the particle measurements within the new location.

4. The gating control device of claim 3, wherein the one or more computer processors are configured to execute the executable instructions to at least cause display of a polygon bounding measurements corresponding to the second portion of the particle measurements.

5. The gating control device of claim 1, wherein the one or more computer processors are further configured to execute the executable instructions to at least:
    receive, from the event listener, a gate scaling event indicating new scaling parameter for the first plot;
    update the scaling parameter included in the data record to identify the new scaling parameter; and
    update the vertices included in the data record by scaling the linear vertices using the new scaling parameter.

6. The gating control device of claim 5, wherein the one or more computer processors are further configured to execute the executable instructions to at least:
    identify a first portion of the particle measurements within a scaled area of interest; and
    upon receiving the gate scaling event, identify a second portion of the particle measurements within the scaled area of interest.

7. The gating control device of claim 6, wherein the one or more computer processors are configured to execute the executable instructions to at least cause display of a polygon bounding measurements corresponding to the second portion of the particle measurements.

8. The gating control device of claim 1, wherein the one or more computer processors are further configured to execute the executable instructions to at least:
    cause display of a first polygon formed by the vertices;
    receive, from the first input device via the input device port, a second set of measurements for presentation via a second plot having a second scaling parameter;
    generate second vertices by scaling the linear vertices using the second scaling parameter; and
    cause display of a second polygon on the second plot, wherein the second polygon is formed by the second vertices.

9. The gating control device of claim 8, wherein the one or more computer processors are further configured to execute the executable instructions to at least:

receive, from the event listener, a gate scaling event indicating new scaling parameter for the second plot; and update the scaling parameter included in the data record to identify the new scaling parameter; and update the vertices included in the data record by scaling the linear vertices using the new scaling parameter.

10. The gating control device of claim 8, wherein the one or more computer processors are further configured to execute the executable instructions to at least:

receive, from the event listener, a gate movement event indicating a new location for the gate on the second plot;

update the vertices included in the data record to identify the new location of the gate; and update the linear vertices included in the data record based on the new location for the gate and the scaling parameter.

11. A computer-implemented method comprising:
under control of one or more processing devices,
receiving, from a first input device, gate data including vertices defining an area of interest for a first graphical plot of particle measurements;

determining that the first graphical plot presents the particle measurements using a scaling parameter, wherein the scaling parameter identifies a non-linear scaling factor for at least one dimension of measurement included in the particle measurements;

generating linear vertices for the area of interest based at least in part on the vertices and the non-linear scaling factor; and creating a data record including the scaling parameter, the vertices, and the linear vertices in association with an identifier for the area of interest.

12. The computer-implemented method of claim 11, further comprising:

receiving, from the first input device, a gate movement event indicating a new location for the gate;

updating the vertices included in the data record to identify the new location of the gate; and updating the linear vertices included in the data record based on the new location for the gate and the scaling parameter.

13. The computer-implemented method of claim 12, further comprising:

identifying a first portion of the particle measurements within the area of interest; and upon receiving the gate movement event, identifying a second portion of the particle measurements within the new location.

14. The computer-implemented method of claim 13, further comprising causing display of a polygon bounding measurements corresponding to the second portion of the particle measurements.

15. The computer-implemented method of claim 11, further comprising:

receiving, from the first input device, a gate scaling event indicating new scaling parameter for the first plot;

updating the scaling parameter included in the data record to identify the new scaling parameter; and updating the vertices included in the data record by scaling the linear vertices using the new scaling parameter.

16. The computer-implemented method of claim 15, further comprising:

identifying a first portion of the particle measurements within a scaled area of interest; and upon receiving the gate scaling event, identifying a second portion of the particle measurements within the scaled area of interest.

17. The computer-implemented method of claim 16, further comprising causing display of a polygon bounding measurements corresponding to the second portion of the particle measurements.

18. The computer-implemented method of claim 11, further comprising:

causing display of a first polygon formed by the vertices;

receiving, from the first input device, a second set of measurements for presentation via a second plot having a second scaling parameter;

generating second vertices by scaling the linear vertices using the second scaling parameter; and causing display of a second polygon on the second plot, wherein the second polygon is formed by the second vertices.

19. The computer-implemented method of claim 18, further comprising:

receiving, from the first input device, a gate scaling event indicating new scaling parameter for the second plot; and updating the scaling parameter included in the data record to identify the new scaling parameter; and updating the vertices included in the data record by scaling the linear vertices using the new scaling parameter.

20. The computer-implemented method of claim 18, further comprising:

receiving, from the first input device, a gate movement event indicating a new location for the gate on the second plot;

updating the vertices included in the data record to identify the new location of the gate; and updating the linear vertices included in the data record based on the new location for the gate and the scaling parameter.

* * * * *